United States Patent [19]

Bigler et al.

[11] Patent Number: 4,707,997
[45] Date of Patent: Nov. 24, 1987

[54] SYSTEM AND METHOD FOR DISPENSING FROZEN FOODS

[76] Inventors: Mont D. Bigler, 276 S. 600 East, Alpine, Utah 84003; Jack L. Harsh, 3075 S. 500 East, South Salt Lake City, Utah 84106

[21] Appl. No.: 823,173

[22] Filed: Jan. 27, 1986

[51] Int. Cl.⁴ .............................................. F25C 5/14
[52] U.S. Cl. ...................................... 62/341; 264/28; 222/334; 222/389
[58] Field of Search .......................... 264/28; 100/938; 62/341, 342; 222/334, 389

[56] References Cited

U.S. PATENT DOCUMENTS

| | | | |
|---|---|---|---|
| 252,711 | 1/1882 | Atkiss | 425/310 |
| 1,801,578 | 4/1931 | Stevens | 425/110 |
| 2,201,403 | 5/1940 | Knaust | 425/150 |
| 2,558,887 | 7/1951 | Tesiero | 425/143 |
| 2,719,494 | 10/1955 | Spiess et al. | 425/145 |
| 3,590,750 | 7/1971 | Lamy | 425/279 |
| 3,621,774 | 11/1971 | Dedio et al. | 100/906 X |
| 3,686,889 | 8/1972 | Harza | 62/341 X |
| 3,858,498 | 1/1975 | Swenson | 62/342 X |
| 4,229,946 | 10/1980 | Slavinsky et al. | 62/341 |
| 4,420,948 | 12/1983 | Savage | 62/340 |

*Primary Examiner*—William E. Tapolcai
*Attorney, Agent, or Firm*—Workman, Nydegger & Jensen

[57] ABSTRACT

A dispenser for frozen foods such as ice cream. The dispenser is provided with a tampering chamber for adjusting and maintaining a volume of frozen food at a tempering temperature, a retention chamber for retaining the frozen food at a holding temperature, and a configuration chamber for configuring the frozen-food for dispensing as well as adjusting and maintaining the frozen food at a serving temperature. Individually controllable hydraulic cylinders are connected to rams which push the frozen food from the retention chamber into the configuration chamber and through an outlet provided in the configuration chamber. As the frozen food passes through the configuration chamber outlet it is received by a scoop which partitions the frozen food into ball-shaped portions.

38 Claims, 12 Drawing Figures

SYSTEM AND METHOD FOR DISPENSING FROZEN FOODS

BACKGROUND OF THE INVENTION

1. The Field of the Invention

This invention generally relates to food dispensing systems. More particularly, this invention relates to food dispensing systems for dispensing foods for immediate consumption which are served in a frozen or semi-frozen form such as ice cream, sherbet, frozen yogurt and the like.

2. The Prior Art

For many years frozen foods such as ice cream have been a favorite food in many parts of the world. Restaurants and other food serving establishments regularly offer a selection of frozen foods to their customers. In addition to ice cream, other frozen foods include sherbet, sorbet, ices, and other frozen desserts. For purposes of convenience, the term "ice cream" is used throughout this disclosure; however, unless it is understood otherwise from the context, that term shall include other frozen foods as discussed above. Ice cream has become so popular that ice cream stores and other establishments emphasizing the sale of ice cream and related foods have become commonplace.

In the food service industry, two general types of ice cream are available. The first type is "hard" ice cream. Hard ice cream is ice cream which when kept at an appropriate temperature for serving remains in a relatively solid form. Hard ice cream is generally the preferred choice among consumers of ice cream. However, due to its "hard" nature, it is often difficult for a commercial establishment to conveniently serve. Hard ice cream is inconvenient to serve due to the fact that a significant amount of manual labor is required to properly remove the hard ice cream from the storage container and place it in a serving receptacle.

In order to avoid the inconvenience encountered when serving hard ice cream, many establishments offer to their customers what is termed "soft" ice cream. This type of ice cream may be easily dispensed by a machine because it is kept in a semisolid state which allows it to be easily extruded and placed in a serving receptacle by a machine.

Dispensing ice cream by using a machine offers significant advantages over manual methods; nevertheless, consumers of ice cream generally prefer hard ice cream over soft ice cream. Thus, establishments which serve ice cream have previously been faced with the decision of pleasing customers by serving hard ice cream, with its attendant labor costs and inconvenience, or by offering their customers soft ice cream with its accompanying benefit of mechanized dispensing.

Ice cream serving establishments have been faced with many problems when using manual methods to serve hard ice cream. For example, typically the containers which hold hard ice cream are kept in a horizontal freezer holding many open ice cream containers with each ice cream container usually holding several gallons. The freezer doors must be opened each time the ice cream is accessed. The constant opening of the freezer by employees makes regulation of the ice cream temperature difficult. As the temperature of the ice cream varies the consistency and quality also varies.

Furthermore, if the temperature of the ice cream is too high, harmful bacterial growth may be encouraged. The danger of bacterial growth is of such great concern to health and food inspection agencies, that strict rules and regulations regarding the serving of ice cream and other frozen foods have been promulgated. Such regulations often mandate a maximum temperature at which ice cream may be stored.

In an effort to comply with state regulations and to allow for warming of the ice cream due to frequent access to the ice cream containers, some establishments serving ice cream maintain their ice cream at a temperature far below the desired temperature, thereby causing the ice cream to be excessively hard. The result is that "scooping" (i.e., serving) of the ice cream by employees is a difficult and fatiguing task. Alternatively, some establishments keep their ice cream above the desired temperature so as to make "scooping" of the ice cream easier. While maintaining ice cream at a temperature above the desired temperature makes serving the ice cream easier, it may also degrade the quality of the ice cream and promote undesirable growth of bacteria. In addition to these problems, horizontal freezers generally require an increased amount of energy, and thus expense, in order to keep the ice cream below the maximum allowable temperature.

A further problem is that the "horizontal freezer" method of storing and serving ice cream presents the potential of creating unsanitary conditions. Since employees are constantly bending over the open ice cream containers, as well as the open containers, in some cases, being accessible to customers, a potential hazard exists from the accidental contamination of the ice cream by foreign objects. This contamination problem is increased in establishments utilizing the "hand scoop" method of serving the ice cream. Still another problem faced by establishments utilizing the "hand scoop" method of serving ice cream is that of maintaining consistency in the amount of ice cream provided from serving to serving. All of these problems have lead to efforts in the past to provide a workable and efficient mechanized system for dispensing ice cream.

One previous attempt to mechanize the dispensing of hard ice cream is disclosed in U.S. Pat. No. 2,201,403, where a motorized ice cream scoop is used. The scoop is substantially hemispherically-shaped with its bottom end closed except for an oval opening. The scoop is mounted on the shaft of a hand-held motor so that the scoop spins about its axis. While the scoop is spinning it is pushed into the ice cream which is collected into the scoop through the oval opening in the bottom of the scoop. The scoop may then be opened to dispense the ice cream. While the motorized scoop approach provides for easier scooping of the ice cream and more consistent portion sizes, it still requires extensive manual labor to serve hard ice cream and does not eliminate the problems inherent in the "open freezer" method of storing ice cream.

Another approach to solving the problems described above is disclosed in U.S. Pat. No. 3,590,750. This patent discloses a machine for making ice cream cone size portions of hard ice cream in which an open container of ice cream is mounted on a turntable and rotated. A scoop is lowered into the rotating container of ice cream until sufficient ice cream has been collected in the scoop. The scoop is then withdrawn, and the ice cream delivered to a location outside of the machine for service to the consumer. While this approach initially appears to have some practical advantages, implementing this approach in a practical dispensing system appears to be very complex, difficult, and unreliable for use in a commercial establishment which requires consistent performance.

Another attempt to provide a mechanized ice cream dispensing system is shown in U.S. Pat. No. 2,719,494, which shows a device utilizing a piston to force a volume of hard ice cream from a container, through a tube and into a receiving scoop. Once the scoop is filled, the scoop is rotated to form a ball of ice cream which is then placed in a serving receptacle. Likewise, U.S. Pat. No. 4,420,948 discloses a similar arrangement in which a piston forces a volume of hard ice cream from a horizontally disposed container, through a tube, then into a double scoop apparatus. Previous attempts at providing an extrusion-type ice cream dispenser, such as shown in U.S. Pat. Nos. 2,719,494 and 4,420,948, have met with disappointing results. Several major problems exist with these "extrusion-type" systems.

First, none of the previous attempts recognized the fact that the "hardness" of ice cream (or other frozen foods) at a particular temperature is determined by the ingredients used in the frozen food. Thus, not only do frozen foods such as sherbets and ice creams vary in their hardness at a particular temperature, but particular flavors of each type of frozen food may have significant variations in hardness at any particular temperature. Unfortunately, the "extrusion-type" dispensers of frozen foods can only operate properly when the hardness of the frozen food is within certain parameters. For example, chocolate, strawberry, and vanilla ice cream all kept at 0° F. have significant differences in their hardness. Furthermore, due to the fact that various manufacturers of ice cream use widely differing ingredients, the hardness of one manufacturer's chocolate ice cream at a particular temperature may be different than the hardness of any other manufacturer's chocolate ice cream at the same temperature. The prior attempts at producing a frozen-food dispenser suitable for dispensing hard ice cream, and other similar frozen foods, have not recognized that various flavors of the same type of frozen food, particularly various frozen desserts such as ice cream, behave differently from one another at the same temperature. The fact that frozen foods vary in hardness presents a problem when attempting to design a frozen food dispenser which can accommodate a variety of frozen foods.

Second, the prior attempts have not recognized the related subtlety encountered when handling frozen foods, i.e., that the temperature at which a frozen food should be maintained differs according to what is to be done with the food. As an example, consider the case of "Brand X vanilla hard ice cream." The temperature at which the ice cream should be kept for long-term storage might ideally be −40° F. to −20° F. However, the temperature at which the ice cream may be kept for short-term storage, say less than three days, is preferably about +5° F. This short-term storage temperature is set so that the ice cream will maintain its flavor, consistency, and texture for the expected storage period, but yet take considerably less time to reach the appropriate serving temperature (as discussed below) than from its long-term storage temperature. Finally, Brand X vanilla hard ice cream may be desirably served at a temperature of from about +10° F. to about +12° F.

The recognition of these factors when dealing with frozen foods, particularly ice cream, is notably absent from the earlier teachings in the art. Still further, when designing a dispensing system for frozen foods, these temperatures are critical, and the system must provide a means for adjusting and maintaining the temperature of the frozen food to the proper temperature within very narrow tolerances. This requirement is also notably absent from the earlier teachings in the art.

Third, previous attempts at "extrusion-type" ice cream dispensing systems (such as U.S. Pat. No. 2,719,494 and No. 4,420,948) do not teach the importance of properly applying pressure to the ice cream as it is extruded. The devices shown in these patents make it appear a simple matter to continuously apply sufficient pressure to the ice cream to force it through a given length of tube. In practice, such is not the case in a working frozen food dispensing system.

The pressure applied to the frozen food in the extrusion process must be precisely controlled, both by the method used to apply the pressure and by the path through which the frozen food travels. This characteristic is in opposition to the teachings of U.S. Pat. No. 4,420,948, which teaches constant pressure on a volume of frozen food through a tubular member.

All of the above considerations, which have remained unrecognized in the prior art, are essential to the design of a workable frozen food dispenser. In view of the problems discussed above, it would be a great improvement in the art to provide a mechanized frozen food dispensing system wherein the quality of the frozen food is maintained from storage to serving of the frozen food. It would also be a significant advancement in the art to provide a frozen food dispenser which protects the frozen food from unsanitary conditions, and which inhibits the growth of undesirable microorganisms. It would also be a significant improvement in the art to provide a frozen food dispensing system which greatly reduces the manual effort required to serve frozen foods while achieving the other above-mentioned benefits. The present invention recognizes all of the above-mentioned considerations and provides a practical frozen food dispensing system.

BRIEF SUMMARY AND OBJECTS OF THE INVENTION

The present invention provides a system whereby the mechanized dispensing of frozen foods is efficiently and practically carried out. The invention provides that a volume of frozen food is removed from long-term storage and is adjusted and maintained at a tempering temperature. After the volume of frozen food has been properly prepared by reaching the predetermined tempering temperature throughout, the frozen food is placed in a retention chamber. The retention chamber precisely maintains the temperature of the frozen food at a predetermined holding temperature. Upon demand, the frozen food is moved out of the retention chamber through a first end by an apparatus mounted at a second end of the retention chamber and which is able to precisely control the pressure exerted upon, and the movement of, the frozen food through the retention chamber.

At the first end of the retention chamber a configuration chamber is attached. This configuration chamber is provided with a structure so as to precisely adjust and maintain the temperature of the frozen food entering the configuration chamber at a predetermined serving temperature. Furthermore, the configuration chamber is shaped so as to carefully manipulate the pressure exerted upon the frozen food as it passes through the configuration chamber. The frozen food is allowed to exit through an opening in the configuration chamber where it is partitioned into individual servings.

In view of the foregoing it is a primary object of the present invention to provide a mechanized frozen food dispensing system wherein the quality of the frozen food is consistently maintained from storage to serving of the frozen food.

Another object of the present invention is to provide a mechanized frozen food dispensing system which allows frozen foods to be dispensed with a minimum of effort.

A further object of the present invention is to provide a mechanized frozen food dispensing system which isolates the frozen food from potentially unsanitary conditions during the dispensing process.

A still further object of the present invention is to provide a frozen food dispensing system which inhibits the growth of harmful organisms within the frozen food due to improper temperature maintenance.

Furthermore, it is another object of the present invention to provide a frozen food dispensing system which allows the size of individual portions of frozen food to be consistently maintained from serving to serving.

The present invention, embodied in the structure shown in the accompanying figures and described in the text found below, meets these objectives far better than any of the known previous attempts in the art.

DETAILED DESCRIPTION OF THE PREFERRED EMBODIMENTS

A. Introduction

Reference will now be made to the drawings wherein like parts are designated with like numerals throughout.

Figure 1:
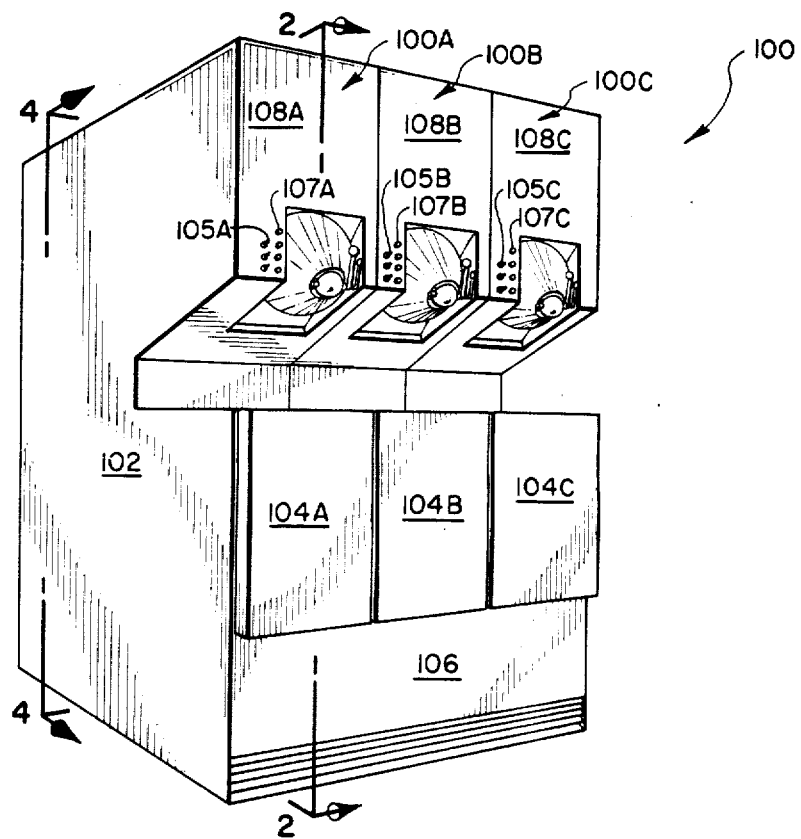
FIG. 1 is a perspective view of a presently preferred embodiment of the present invention incorporating three individual dispensing systems.

One presently preferred embodiment of the present invention, generally designated 100, is shown in FIG. 1. The embodiment of FIG. 1 is capable of independently dispensing frozen food from three separate dispensers 100A, 100B and 100C. As used hereinafter, when the terms "frozen foods" or "ice cream" are used it shall be understood that such terms include hard ice cream, and other frozen desserts, such as those previously mentioned, as well as other frozen or refrigerated foods such as potato salad and coleslaw. However, for clarity, the following disclosure will only refer to ice cream since ice cream is the most popular frozen food and the most difficult to dispense properly.

Each dispenser 100A, 100B, and 100C is of identical construction. Thus, the following description will be limited to dispenser 100A, but it should be understood that all of the dispensers may be of identical structure. It should also be understood that, according to the present invention, each dispenser is prepared to dispense a particular frozen food, as will be explained shortly. The embodiment shown in FIG. 1, with three individual dispensers 100A, 100B, and 100C, may thus be prepared to dispense three different frozen foods. However, it is within the scope of the present invention for an embodiment to include only a single dispenser or a great number of dispensers with each dispenser incorporating the features discussed in greater detail hereinafter.

In the following description, a general indication of the structure and operation of the invention, as incorporated in the embodiment shown in the figures, is given first. An explanation of the characteristics of frozen foods is then be provided, and lastly, a detailed description of the individual components, and their function, of the presently preferred embodiment is set forth.

B. The General Structure and Operation of the Preferred Embodiment

Ice cream is generally maintained at a temperature of below $-20°$ F., and often as low as $-40°$ F., for long-term storage and is usually kept in individual cylindrical containers holding approximately three gallons each. These containers are usually composed of a paper-like product and are equipped with ends which may be easily removed.

Figure 2:
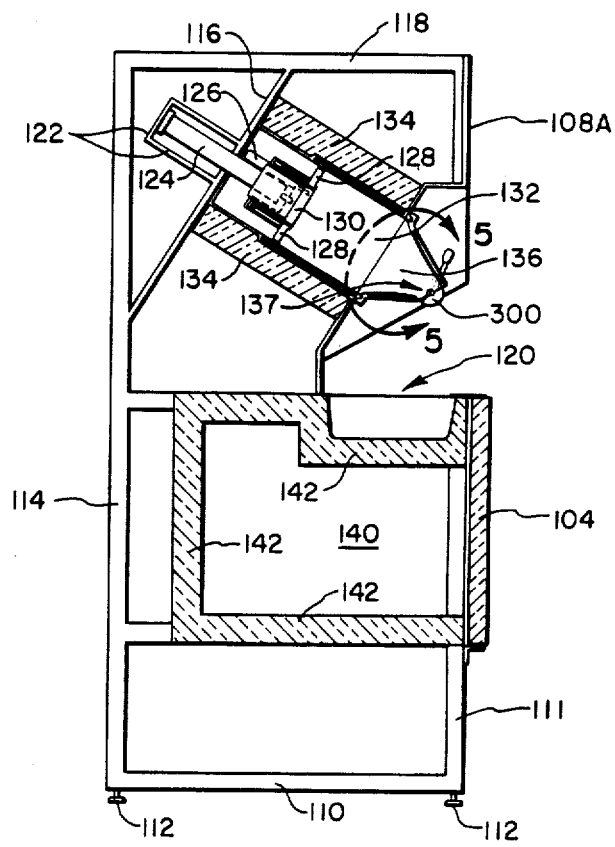
FIG. 2 is a cross-sectional view of the embodiment shown in FIG. 1 taken along line 2—2 of FIG. 1.

According to the present invention, the ice cream to be dispensed by the system is removed from a long term storage area, not shown, and placed in tempering chamber 140 which is shown best in FIG. 2. Tempering chamber 140 is provided with a refrigeration circuit which ensures that the temperature of the ice cream is precisely adjusted and maintained at a tempering temperature. As an example, the tempering temperature of a vanilla flavored ice cream may be about 5° F., while the tempering temperature of a coconut flavored ice cream may be $-8°$ F. Generally, ice cream sufficient to last several days will be placed in, and rotated through, tempering chamber 140. Ice cream may be stored in tempering chamber 140 for several days without any degradation in quality.

Once the temperature of the ice cream has been adjusted so that the ice cream is at a tempering temperature throughout its volume, it may be placed in retention chamber 132, shown best in FIG. 2. Before the ice cream is placed in retention chamber 132, both ends of the ice cream container, not shown in FIG. 2, are removed. Retention chamber 132 is provided with a separate refrigeration circuit so as to rapidly adjust and maintain the entire volume of the ice cream at a holding temperature, which is somewhat higher than the tempering temperature as will be explained hereinafter.

It will be appreciated that adjusting and maintaining the ice cream at a tempering temperature—the tempering temperature being intermediate between the long-term storage temperature and the holding temperature—allows the retention chamber refrigeration circuit to very rapidly adjust the temperature of the ice cream to a holding temperature throughout its volume. The retention chamber refrigeration circuit and the structure of the retention chamber 132 itself is explained in detail below.

At a first end of retention chamber 132 is provided a configuration chamber 136, as shown best in FIG. 2. In the present embodiment, configuration chamber 136 has a generally conical shape with an opening, generally designated 137, provided near its apex. Configuration chamber 136 is provided with a refrigeration circuit which precisely adjusts and maintains the temperature of any ice cream contained therein at the predetermined serving temperature. Furthermore, the interior shape of configuration chamber 136 is carefully chosen so as to precisely control the pressure exerted upon the ice cream and the flow of the ice cream through configuration chamber 136.

In the illustrated embodiment, opening 137 of configuration chamber 136 is provided with a rotating scoop 300 to partition the ice cream into individual portions as it passes through the configuration chamber opening 137. Two hydraulic cylinders 124 and 126 and rams 128 and 130 are provided so as to push the ice cream from retention chamber 132 through configuration chamber 136 and into scoop 300. The hydraulic circuit is constructed so as to allow the movement of the ice cream to be precisely controlled, which is essential both to maintaining the quality of the ice cream and to providing a practical ice cream dispenser. Once the ice cream has been partitioned into an individual serving, it may be removed from scoop 300 and served.

The frame members of the embodiment, shown in FIG. 2, include top frame 118, bottom frame 110, front frame 111, and rear frame 114 and may all be fabricated of steel using fabrication techniques well known in the art. Panel members, shown in FIG. 1, include side panel 102, tempering chamber doors 104A, 104B, and 104C, bottom panel 106, and configuration chamber access doors 108A, 108B, and 108C, and are preferably fabricated of a food service grade of stainless steel. Switches 105A, 105B, and 105C, are used to control dispenser functions while indicator lights 107A, 107B, and 107C, convey operating information to the operator. Sink, generally designated 120 in FIG. 2, is provided to assist during the cleaning of the dispensers.

C. The Temperature-Dependent Characteristics of Ice Cream

The present invention accomplishes its desired results by recognizing that ice cream behaves differently depending on the temperature at which it is maintained. Of special concern is the hardness of the ice cream.

The specific ingredients of an ice cream (e.g., butterfat, sugar, nonfat milk solids and stabilizer and emulsifier contents) principally determine the characteristics of the ice cream at a particular temperature. Thus, the temperature of the ice cream must be adjusted before it may be properly dispensed by a mechanized dispenser. Furthermore, personal preferences may dictate the temperature at which ice cream is best served.

As an example of the variations in ingredients of ice cream, Table I indicates the relative percentage content of some ingredients of two "types" of ice cream—an "average" ice cream and what is generally referred to as a "premium" ice cream. The values shown in Table I were obtained from the publication Soft-Frozen Dairy Products by S. H. Lombard (1965).

TABLE I

|  | Butter Fat | Nonfat Milk Solids | Sugar | Stabilizers & Emulsifiers |
|---|---|---|---|---|
| "Average" Ice Cream | 12% | 11% | 15% | 0.3% |
| "Premium" Ice Cream | 16% | 7–8% | 15% | 0.25% |

From Table I, it can be appreciated that there are variations in the compositions of ice creams from one brand to another. Still further, it will be easy to realize that the composition of one flavor of ice cream to another flavor, even though produced by the same manufacturer, may vary significantly. Still further, the variation in compositions from an ice cream to a sherbet, to a frozen fruit-based dessert, or to a gelato varies even more significantly than the composition of various ice creams.

Due to the widely varying compositions of ice creams, and other frozen foods, each behaves differently at a particular temperature. For example, Table II shows representative temperatures at which various flavors of ice cream should preferably be maintained for maximum utilization of the structure of the pictured embodiment as described herein. All of the ice cream flavors shown in Table II are manufactured by the Snelgrove Ice Cream Co., Inc., of Salt Lake City, Utah; correspondingly, the flavors listed in Table III are manufactured by the Brigham Young University Dairy Products Laboratory of Provo, Utah. Comparison of the values given in Tables II and III demonstrate the differing characteristics of ice cream from flavor to flavor and manufacturer to manufacturer.

TABLE II

|  | Tempering Temperature | Holding Temperature | Serving Temperature |
|---|---|---|---|
| Canadian Vanilla | +5° F. ± 2° F. | +8° F. ± 1° F. | +10 to +12° F. ± 1° F. |
| Chocolate | +0° F. | +5 to +6° F. | +8° F. |
| Strawberry | −5° F. | 0° F. | +5 to +6° F. |
| Coconut | −8° F. | −4° F. | −2 to 0° F. |

TABLE III

|  | Tempering Temperature | Holding Temperature | Serving Temperature |
|---|---|---|---|
| Vanilla | +5° F. ± 2° F. | +8° F. ± 1° F. | +10 ± 1° F. |
| Chocolate | +2° F. | +5° F. | +7° F. |
| Strawberry | 0° F. | +3° F. | +5° F. |
| Coconut | −5° F. | −2° F. | +2° F. |

As is apparent from the information contained in Tables II and III, small differences in ice cream ingredients require variations in temperature which are extremely important in the proper dispensing of ice cream when using the illustrated embodiment. As can be appreciated from the values contained in Tables II and III, the temperatures are preferably maintained within narrow temperature tolerances. Since precisely controlled refrigeration is essential to the present invention, the refrigeration system of the illustrated embodiments is next explained in detail.

D. The Refrigeration System of the Illustrated Embodiments

Figure 3:
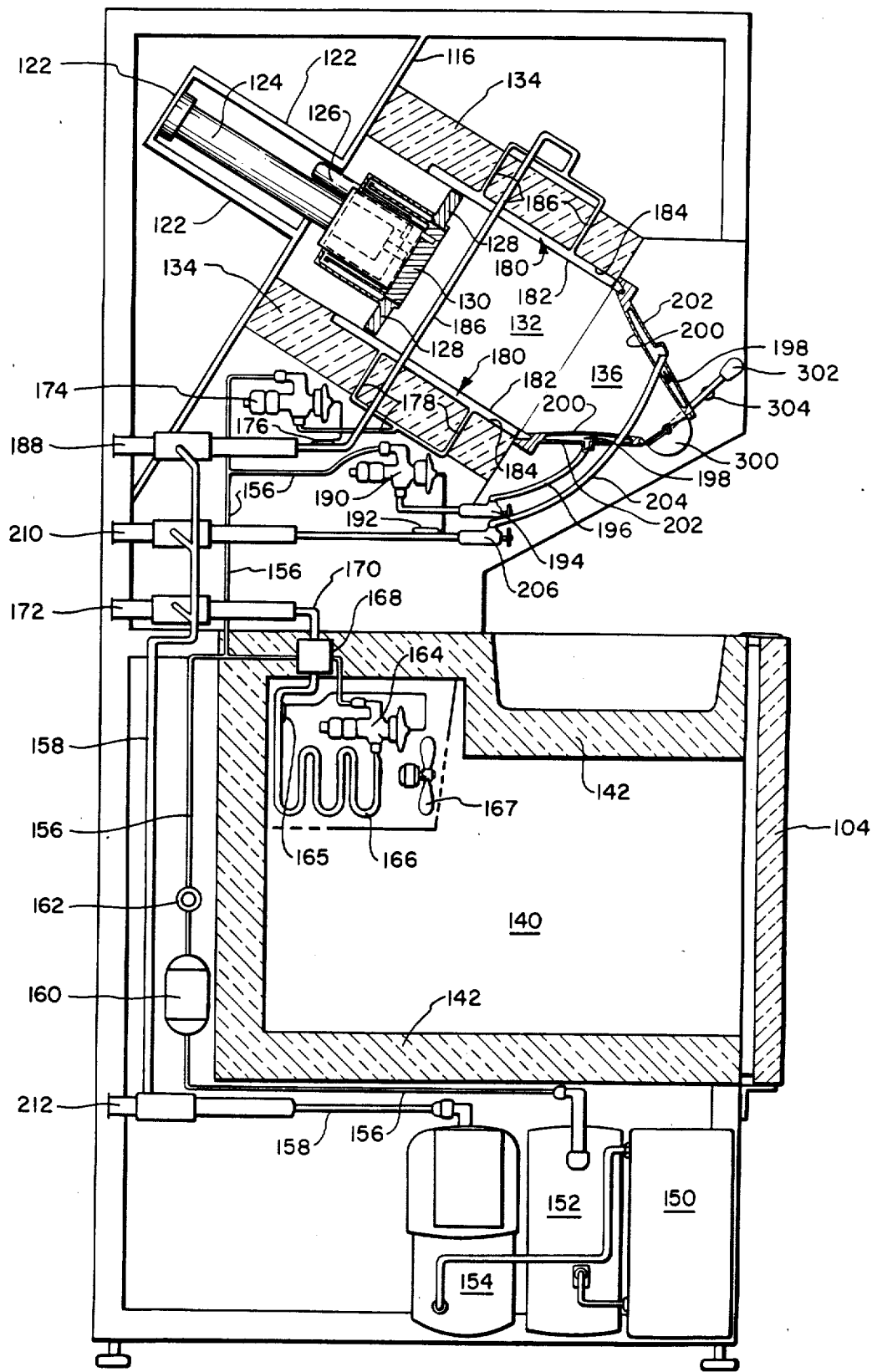
FIG. 3 is a cross-sectional view of the embodiment shown in FIG. 2 showing the layout of the refrigeration system.

The refrigeration system of the illustrated embodiment incorporates three individually controlled refrigeration circuits: a tempering chamber refrigeration circuit, a retention chamber refrigeration circuit, and a configuration chamber refrigeration circuit. All three refrigeration circuits share some common components. The layout of the refrigeration system is shown in FIG. 3.

Tempering chamber 140 and retention chamber 132 are each surrounded with insulation jackets 142 and 134, respectively. In the present embodiment, insulation jackets 142 and 134 are each approximately 2½" thick with an aluminum and mylar laminate applied to both sides so as to give each insulating jacket an "R" factor of greater than 19.

All three refrigeration circuits share a common condenser coil 150, liquid receiver 152, and compressor 154. Compressor 154 which is used in the illustrated embodiment, is manufactured by Tecumseh Products Company, Tecumseh, Mich. (Model No. 2425) and has a capacity of one-half ton. (A ton of refrigeration represents the rate of cooling produced when a ton of ice melts during a twenty-four hour period. The ice is assumed to begin at 32° F. and end as water at 32° F. A ton of refrigeration is equal to about 3540 watts.) Liquid receiver 152 associated with compressor 154 is manufactured by Refrigeration Research, Brighton, Mo. (Model No. 1918) and has a capacity of six pounds. Condenser coil 150 is also manufactured by Tecumseh Products Company and may be purchased as a set with compressor 154.

After compressor 154 begins operation, the refrigerant, which in the preferred embodiment is manufactured by E. I. duPont de Nemours & Co. and designated as "R 12" (Dichlorodifluoromethane $CCl_2F_2$) leaves liquid receiver 152 by way of liquid line 156. In FIG. 3, refrigeration system lines containing pressurized refrigerant are indicated by the "narrow tubing", while the suction lines, or vapor return lines, in the system are indicated by the "wide tubing."

From liquid receiver 152 the liquid refrigerant travels to filter dryer 160 which uses an activated alumina desiccant as the drying agent. The refrigerant next passes through sight glass 162 which allows observation of the refrigerant within the line and particularly allows the visual detection of water in the refrigerant by way of a color coded indicator. The pressurized refrigerant line 156 first branches off to the tempering chamber refrigeration circuit.

The tempering chamber refrigeration circuit includes a forced air evaporator placed in tempering chamber 140 including an evaporator coil 166, an fan 167, and a defroster 168. The flow of refrigerant to evaporator coil 166 in tempering chamber 140 is controlled by thermostatic expansion valve 164.

Thermostatic expansion valve 164, hereinafter referred to as a "TE valve," is manufactured by Sporlan Valve Company, St. Louis, Mo. Two other similar TE valves 174 and 190 each individually control the flow of refrigerant to the retention chamber refrigeration circuits and configuration chamber refrigeration circuits, respectively. The TE valves used in the preferred embodiment make use of sensing bulb. Sensing bulb 165 is connected to tempering chamber TE valve 164.

Sensing bulb 165 detects the temperature of the refrigerant leaving evaporator 166 and the pressure within sensing bulb 165 is varied accordingly. The pressure within sensing bulb 165 is communicated back to the main body of TE valve 164 which causes TE valve 164 to either open or close. The opening and closing of TE valve 164 controls the flow of refrigerant to coil evaporator 166. Thus, the flow of refrigerant into coil evaporator 166 is controlled according to the temperature of the refrigerant leaving evaporator 166. Controlling the flow of the refrigerant through the coil evaporator 166 in this way maintains the desired super heat. When the term "super heat" is used in connection with TE valves it refers to the difference in temperature between the vapor on the low pressure side of TE valve 164 and sensing bulb 165. The operation of the remaining two TE valves 190 and 174 is essentially the same.

From coil evaporation 166, the refrigerant enters tempering chamber vapor suction line 170 which is connected to tempering chamber evaporator pressure regulating value 172. Evaporator pressure regulating valve 172, hereinafter referred to as an "EPR valve," as used in the illustrated embodiment, is manufactured by the Sporlan Valve Company, St. Louis, Mo., as are TE valves 164, 174, and 190. Tempering chamber refrigeration circuit EPR valve 172 is identical to retention chamber refrigeration circuit EPR valve 188 and also configuration chamber refrigeration circuit EPR valve 210. The EPR valves 172, 188, and 210 each are adjustable and provide extremely precise control of the pressure of the refrigerant contained within their respect evaporators 166, 180, and 198. Thus, by the pressure regulating action of EPR valves 172, 188, and 210, and of TE valves 164, 174, and 190, the temperatures at each of evaporators 166, 180, and 198 is precisely controlled.

After passing through tempering chamber EPR valve 172, the refrigerant enters a common vapor suction line 158 which is connected to crank case pressure regulating valve 212. Crank case pressure regulating valve 212 is also manufactured by the Sporlan Valve Company. Crank case pressure regulating valve 212 is necessary to prevent overloading of compressor 154 when the compressor is started up after having been shut down long enough for the refrigeration system to reach ambient temperature. Crank case pressure regulating valve 212 is set to allow a maximum pressure to the crank case of 20 p.s.i.

As stated previously, tempering chamber refrigeration is provided by coil evaporator 166. Since tempering chamber 140 is a refrigerated air space, proper compensation must be made for the fact that the temperature of the air immediately surrounding coil evaporator 166 will not be the same as the air in other portions of tempering chamber 140. This condition is aggravated by the fact that tempering chamber door 104 will be opened periodically to insert and remove ice cream containers. Furthermore, the intermittent opening of tempering chamber door 104 allows room temperature air, as well as moisture, to enter tempering chamber 140.

The realization that the temperature in tempering chamber 140 will not be as well regulated as in retention chamber 132 or configuration chamber 136 is recognized by the increased tolerances for the tempering temperatures as shown in Tables II and III (i.e., ±2° F. rather than ±1° F. as is required for the holding and serving temperatures). Tempering chamber 140 should be large enough to provide room for at least a twenty-four hour supply of ice cream, since approximately twenty-four hours is required for a standard three gallon volume of ice cream to warm from a long-term storage temperature, e.g., −20° F. to −40° F., to an appropriate tempering temperature.

While the temperature of the air immediately surrounding coil evaporator 166 and the air found in other parts of tempering chamber 140 differ, the difference is usually constant except for changes caused by introduction of new volumes of ice cream or by opening the tempering chamber door 104. Thus, once the temperature differential between the temperature at evaporator coil 166 and the temperature of the air within tempering chamber 140 is determined, it remains relatively constant.

In the illustrated embodiment, maintaining the temperature of coil evaporator 166 at 5° F. below the desired temperature of the air within tempering chamber 140 maintains the air in tempering chamber 140 and the volumes of ice cream at the proper tempering temperature. Also, since tempering chamber 140 is intermittently filled with moisture-laden air, depending upon the humidity of air surrounding the apparatus, frost build-up may occur on coil evaporator 166. Frost build-up on evaporator 166 may significantly alter the temperature of the air within tempering chamber. In order to avoid this undesirable occurrence, an automatic defroster, represented by the block marked 168, is used. Automatic defroster 168 operates by disconnecting the tempering chamber refrigeration circuit from the rest of the refrigeration system and then circulating hot liquid through coil evaporator 166 until the frost is removed whereupon the tempering chamber refrigeration circuit is reconnected to the rest of the system. Alternatively, an automatic electric defrost coil (not shown) could be used in place of the hot liquid defroster. In the illustrated embodiment, coil evaporator 166, fan 167, and automatic defroster 168 may be obtained as a set from the Bohn Heat Transfer Division of Gulf & Western Manufacturing Company, Danvill, Ill.

It should be appreciated that the inclusion of tempering chamber 140 in the present embodiment is for the convenience of the operators of the device. The tempering chamber 140 may be replaced by an external refrigeration unit, not shown in the figures, which is capable of maintaining the temperature of the ice cream inserted therein to a particular temperature within the range of about ±2° F.

While refrigeration units capable of maintaining such close tolerances are uncommon, they can be produced by those skilled in the art of refrigeration. Thus, tempering chamber 140 may be located a distance away from the rest of the embodiment. Alternatively, the tempering step may be eliminated entirely, but an undesirable length of time will required between insertion of the ice cream into the retention chamber and the ice cream reaching the proper holding temperature throughout its volume.

The portion of the refrigeration system associated with retention chamber 132 will now be explained by continuing to make reference to FIG. 3. The configuration chamber refrigeration circuit receives refrigerant from common liquid refrigerant line 156. Refrigerant from liquid line 156 enters retention chamber TE valve 174. Retention chamber TE valve 174 and its associated sensing bulb 176, operate in the same fashion as described above in connection with tempering chamber TE valve 164 and sensing bulb 165.

After passing through retention chamber TE valve 174, the refrigerant is communicated to retention chamber evaporator 180 by way of retention chamber saturated vapor feed lines 178. Retention chamber evaporator 180 is shown in the art as a flooded evaporator. Flooded evaporators are used in both the retention chamber 132 and configuration chamber 136 refrigeration circuits, while a coil evaporator 166 is used in the tempering chamber refrigeration circuit.

Retention chamber 132 is defined by the inner wall 182 of retention chamber flooded evaporator 180 and is generally cylindrical so as to match the shape and diameter of the standard three gallon ice cream container commonly in use. This allows the common paper-like ice cream container to be used with the presently preferred embodiment by simply removing both ends of the cylindrical ice cream container and inserting the open container into retention chamber 132. It should be realized, however, that other shapes and sizes of retention chambers may be used according to the present invention.

Figure 6:
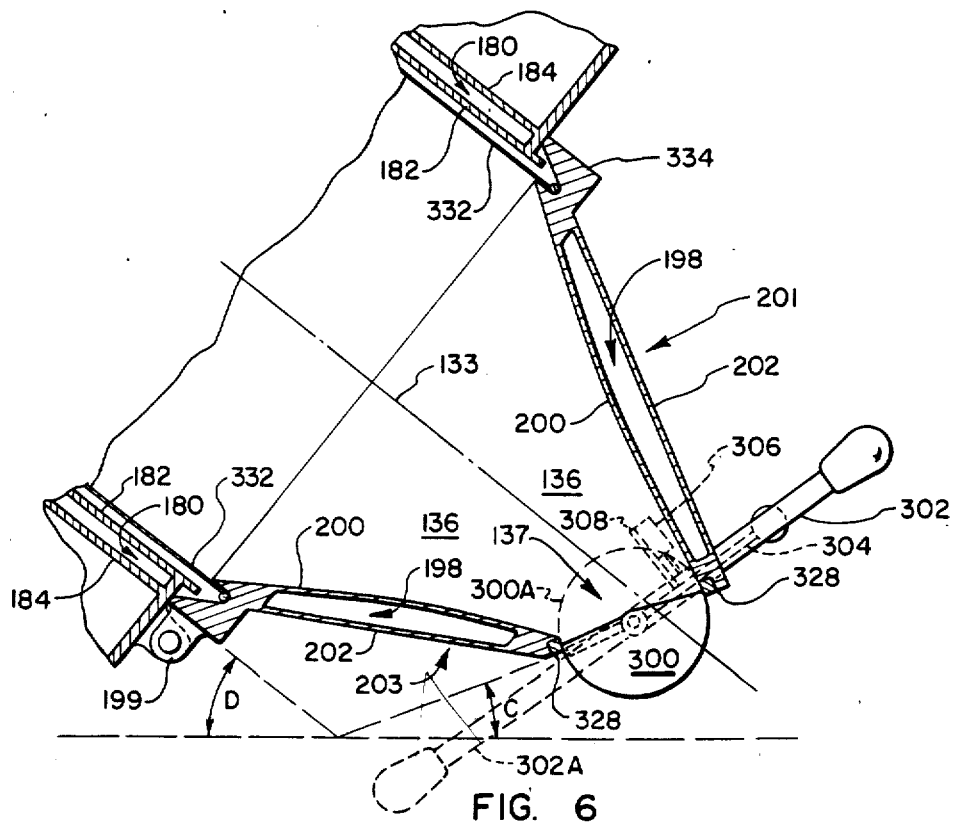
FIG. 6 is a cross-sectional view taken along line 6—6 of FIG. 5.
Figure 7:
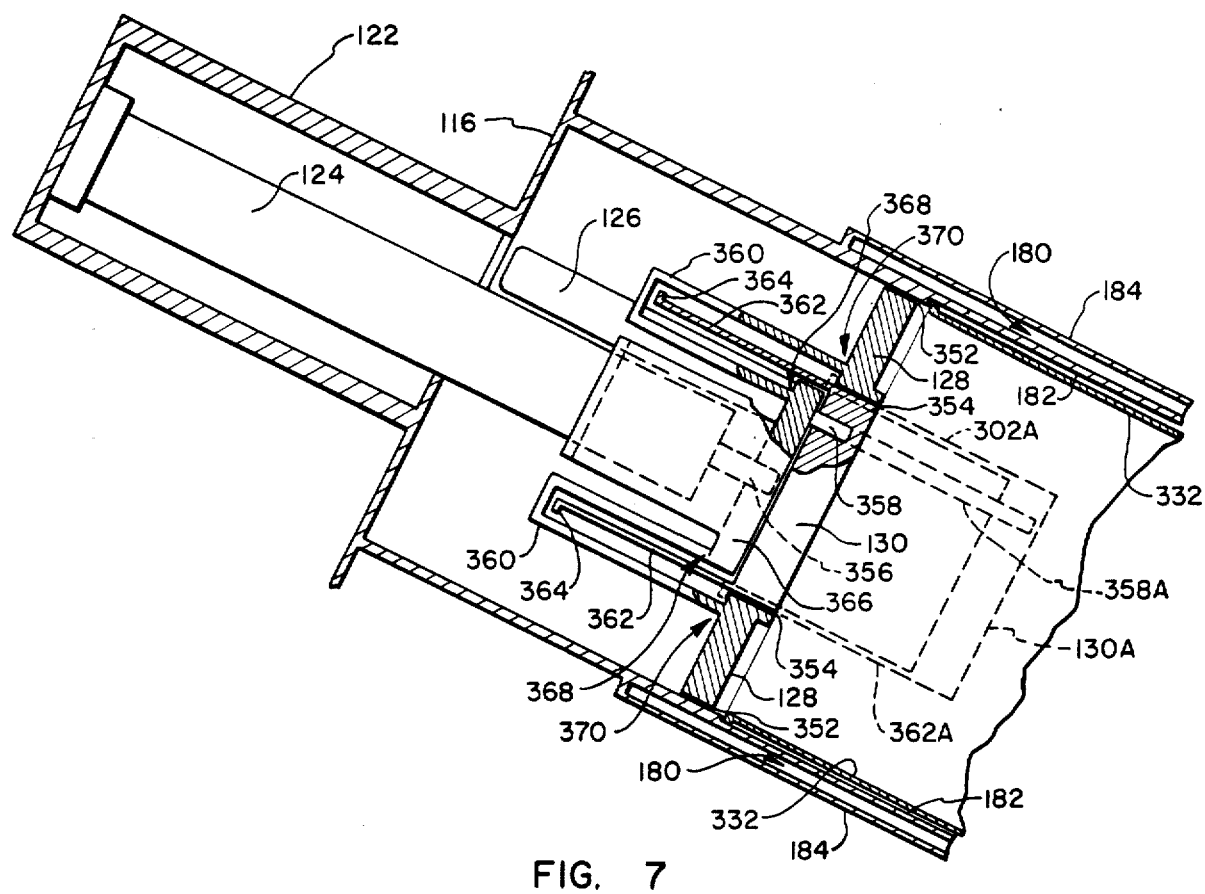
FIG. 7 is a cross-sectional view showing in detail the hydraulic cylinder and ram arrangement used in the presently preferred embodiment.

As can be seen best in FIGS. 6 and 7, the retention chamber 132 is defined by a double walled cylinder. The flooded evaporator cavity, generally designated 180 and disposed between the inner wall 182 and outer wall 184, is directly connected to the retention chamber saturated vapor feed lines 178 at a first position on outer wall 184 as shown in FIG. 3 Also, retention chamber vapor suction lines 186 are directly connected to retention chamber outer wall 184 in a position directly opposite the position where saturated vapor feed lines 178 are connected. Thus, refrigerant enters and floods the flooded evaporator 180 by traveling from saturated vapor feed lines 178 to vapor suction lines 186. This arrangement provides for very precise control of the temperature of the evaporator while allowing the evaporator to precisely maintain the temperature of the ice cream placed in proximity to evaporator wall 182.

In the illustrated dispenser, the ice cream container, partially shown in FIGS. 6 and 7 at 332, is inserted directly into retention chamber 132 and thus the volume of ice cream is separated from retention chamber flooded evaporator 180 only by the thickness of the wall of the ice cream container. This allows the dispenser, according to the present invention, to precisely adjust and maintain a volume of ice cream at the proper holding temperature. As can be appreciated, retention chamber flooded evaporator inner wall 182 should be fabricated of a material having a very low specific heat, as well as being acceptable for use in food service applications. Any one of several food service grades of stainless steel is acceptable.

The refrigerant, after exiting retention chamber flooded evaporator 180, as shown in FIG. 3, enters retention chamber vapor suction line 186 and is communicated to retention chamber EPR valve 188. Retention chamber EPR valve 188, as mentioned earlier, is identical to EPR valves 172 and 210 used in connection with the tempering chamber refrigeration circuit and the configuration chamber refrigeration circuit, respectively. Retention chamber EPR valve 188 allows for extremely precise control of the pressure within, and thus the temperature found at, retention chamber flooded evaporator 180. After passing through retention chamber EPR valve 188, the refrigerant enters common vapor suction line 158 so as to return to compressor 154.

The portion of the refrigeration system associated with configuration chamber 136 may be best understood by continued reference to FIG. 3. The configuration chamber refrigeration circuit also receives refrigerant from the common liquid feed line 156. Similar to the retention chamber refrigeration circuit, the refrigerant first passes through configuration chamber TE valve 190. TE valve 190, in cooperation with TE valve bulb 192, controls the flow of refrigerant into configuration chamber flooded evaporator 198. After leaving configuration chamber TE valve 190, the refrigerant passes through shutoff valve 194. Shutoff valve 194 and shutoff valve 206 are provided so that configuration chamber flexible feed line 196 and configuration chamber flexible suction line 204 may be readily disconnected from the remainder of the refrigeration system since it is contemplated that configuration chamber 136 will be periodically removed for routine maintenance. Configuration chamber hinge 199 is provided to facilitate gaining access to configuration chamber 136 and retention chamber 132 for any routine maintenance that may be necessary. The mechanism used to lock configuration chamber 136 in place is not shown in the figures, however those skilled in the art will readily observe several ways to lock configuration chamber 136 in place.

As can be seen in FIG. 3, the interior shape of configuration chamber 136 is defined by a substantially conically-shaped, double-walled member having an inner wall 200 and an outer wall 202. The interior shape of configuration chamber 136 is of great significance to the present invention and will be explained hereinafter.

The cavity between the inner wall 200 and outer wall 202 acts as a flooded evaporator, generally designated 198. Preferably, those structures defining configuration chamber 136 should be fabricated of stainless steel. When the pictured embodiment is in use, the ice cream is in direct contact with inner wall 200; thus, the temperature of the ice cream may be maintained with even greater precision than in retention chamber 132 since a smaller volume of ice cream must be maintained at the proper temperature and since the ice cream is in direct contact with inner wall 200.

The refrigerant is fed into configuration chamber flooded evaporator 198 through feed line 196 and leaves by way of suction line 204. In a fashion similar to that found at retention chamber flooded evaporator 180, configuration chamber flooded evaporator feed line 196 and suction line 204 are connected on opposite sides of configuration chamber flooded evaporator 198.

Configuration chamber suction line 204, in a manner similar to that found with feed line 196, is connected to shutoff valve 206. After passing through suction line 204 shutoff valve 206, the refrigerant enters configuration chamber EPR valve 210 which in the pictured embodiment is identical to the previously described EPR valves. After passing through EPR valve 210, the refrigerant enters common suction line 158 to return to compressor 154 of the refrigeration system.

By use of the above-described refrigeration system, the illustrated embodiment of the present invention is able to maintain three separate and precisely controllable refrigeration circuits. As will be appreciated by those skilled in the art of refrigeration techniques, it is generally considered to be sufficient to employ either TE valves or EPR valves on a particular refrigeration circuit. However, the precision demanded by the present invention requires that both pressure regulating devices be used on each circuit. Furthermore, the use of flooded evaporators in connection with retention chamber 132 and configuration chamber 136 allows these refrigeration circuits to exhibit a cooling circumstance not available with other types of evaporators.

Having explained in detail the operation and structure of the refrigeration system as used in the illustrated embodiment, the important points found in the method and structures used to move the ice cream through the apparatus to a serving receptacle are discussed next.

E. The Hydraulic System of the Preferred Embodiments

The apparatus used to move the ice cream through retention chamber 132 and configuration chamber 136 is very important in the present invention. The movement of the ice cream must be precisely controlled so that excessive pressures are not created within retention chamber 132 or configuration chamber 136. If the ice cream is exposed to excessive pressure, the air contained in the ice cream is forced out, and thus the consistency and quality is subject to deterioration. Also, if excessive pressure is allowed, partitioning of the ice cream may become very difficult or uncontrollable.

Several possible schemes for applying pressure to the ice cream are possible. The preferred method of moving the ice cream through the chambers is by use of a hydraulic cylinder and ram arrangement, as shown best in the FIGS. 4, 7, and 8. Hydraulic (i.e., liquid driven) cylinders were chosen over pneumatic (i.e., gas driven) cylinders due to the exact position control possible with hydraulic cylinders not available with pneumatic cylinders. For a similar reason, hydraulic cylinders were chosen over electric motors. However, devices other than hydraulic cylinders may be used if their limitations are understood and compensated for. The structure of the rams, cylinders, and the layout of the hydraulic system, as used in the pictured embodiment, will be explained next.

The illustrated embodiment uses a double ram arrangement, the rams being shown best in FIG. 7 at 128 and 130, in cooperation with double hydraulic cylinders, the cylinders also being shown best in FIG. 7 at 124 and 126. The cylinder rods 356 and 358 associated with cylinders 124 and 126, respectively, are extendable and retractable according to how hydraulic fluid is applied to cylinders 124 and 126.

In FIG. 7, a cross-section of retention chamber 132 showing the cylinder and ram arrangement, outer ram 128 is provided with a gasket on both its outer circumference 352 and a gasket on its inner circumference 354. Ice cream container 332 is also partially shown in FIG. 7. Outer gasket 352 serves to form a tight seal between the outer circumference of ram 128 and the interior wall of ice cream container, shown in FIG. 7 at 332. Inner gasket 354 serves to provide a tight seal between inner ram 130 and outer ram 128. Outer ram 128 is attached to outer ram connecting plate 366 by outer ram brackets 360, two of which are shown partially cut away in FIG. 7. Outer ram brackets 360 are attached to outer ram connecting plate 366, at the points generally designated 368 in FIG. 7 and to outer ram 128 at points generally designated 370.

Figure 8:
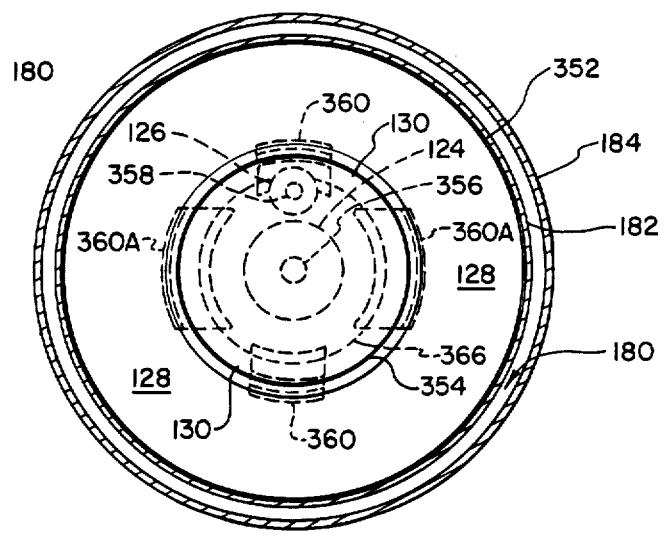
FIG. 8 is an axial view showing in detail the hydraulic cylinder and ram arrangement used in the presently preferred embodiment.

Outer ram connecting bracket 360 is a curved U-shaped member, the U-shape being evident in the cross section of FIG. 8. The U-shape allows inner ram wall 362 to travel freely into and out of the area defined by the U-shaped members 360 while rigidly holding outer ram 128 in a fixed relationship to outer ram connecting plate 366.

Inner hydraulic cylinder 126 is also mounted on connecting plate 366. Connecting plate 366 has a bore provided therethrough so as to allow inner cylinder rod 358 to freely extend or retract. FIG. 8 is an axial view of the ram and cylinder arrangement shown in FIG. 7. Two additional outer ram brackets 360A, not shown in FIG. 7, are shown in FIG. 8. Outer ram brackets 360A are of similar structure, and serve the same function, as outer ram brackets 360. By providing inner ram 130, which is circular as shown in FIG. 8, with walls 362 completely around inner ram's 130 perimeter, a sealing engagement may be maintained as inner ram 130 is extended into retention chamber 132 to its maximum travel as allowed by inner ram stop 364, as shown in FIG. 7. An abrupt perpendicular edge protruding from the end of inner ram wall 362 serves as inner ram stop 364. Inner ram 130 is shown in its maximum extended position by the dashed line marked 130A in FIG. 7.

In beginning operation, both inner ram 130 and outer ram 128 are fully retracted and a full container of ice cream is placed in retention chamber 132. Inner ram 130 is first extended to its maximum travel, as shown in FIG. 7 at 130A, to move the ice cream out of retention chamber 132. After inner ram 130 has been fully extended, it is fully retracted and outer ram 128 is extended by outer cylinder 124. Due to the structure of the double ram arrangement, inner ram 130 is held even with the surface of outer ram 128 while outer ram 128 is extended. After outer ram 128 and inner ram 130 reach the previous position of inner ram 130, inner ram 130 is again extended as explained earlier.

This alternating ram action is repeated as often as is necessary to move whatever volume of ice cream is desired. By use of a smaller inner ram 130, alternating with the movement of a larger outer ram 128, the movement of the ice cream through retention chamber 132 and configuration chamber 136 is effectuated more smoothly than if a single ram arrangement were used. However, it will be appreciated that it is within the scope of the present invention to use a single ram with a single cylinder.

Figure 4:
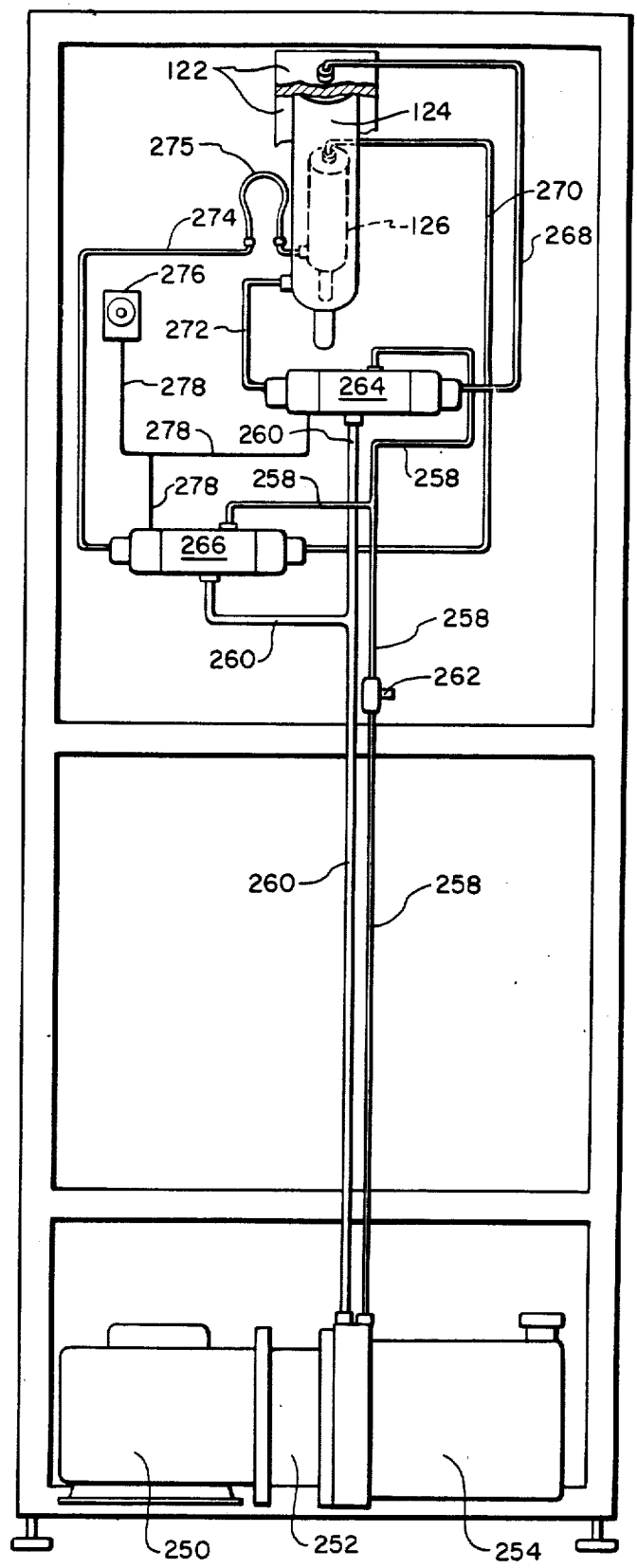
FIG. 4 is a cross-sectional view of the embodiment shown in FIG. 2 showing the layout of the hydraulic system.

Reference is now made to FIG. 4 to explain the general layout of the hydraulic system. Hydraulic fluid reservoir power pack 254 manufactured by Dayton Electric Mfg. Co., Chicago, Ill. (Model No. 42471) is driven by electric motor 250, also manufactured by Dayton Mfg., rated at ½ horsepower at 1725 rpm. Power pack 254 and motor 250 are connected by coupling 252. The hydraulic fluid leaves power pack 254 by way of pressure fluid line 258 and passes through fluid needle valve 262, manufactured by Parker Fluidpower Hydraulic Valve Division, Elyria, Ohio (Model No. N400B). Needle valve 262 is used to control the flow of hydraulic fluid from power pack 254 to the remainder of the hydraulic system. Pressure fluid line 258 then leads to two hydraulic solenoid and valve manifolds 264 and 266, each available from Dayton Mfg.

Hydraulic solenoid and valve manifold 264 and 266 each provide directional control of the cylinders 124 and 126 and are four-way, three position, spring centered hydraulic solenoid valves. Each cylinder, outer ram cylinder 124 and inner ram cylinder 126 are provided with a separate hydraulic solenoid and valve manifold 264 and 266, respectively.

From hydraulic solenoid and valve manifold 264, the hydraulic fluid is directed, when motion of outer 124 cylinder is desired, through either outer cylinder extending fluid line 268 or outer cylinder retracting fluid line 272. If hydraulic fluid is directed through extending fluid line 268, outer cylinder 124 and outer ram 128 will extend. Likewise, if hydraulic fluid is directed through retracting fluid line 272, outer cylinder 124 and outer ram 128 will retract. A similar arrangement is provided for inner cylinder 126.

As with outer cylinder 124, inner cylinder hydraulic solenoid and valve manifold 266 directs hydraulic fluid under pressure, when motion of inner cylinder 126 is desired, to either extending fluid line 270, or retracting fluid line 274 and flexible retracting fluid line 275, which causes inner hydraulic cylinder 126 and inner ram 130 to respond in a fashion similar to that described above for outer hydraulic cylinder 124.

Outer hydraulic cylinder 124 is mounted to rear retention plate 116 of the embodiment by outer cylinder holding bracket 122 as shown in FIG. 7. Inner hydraulic cylinder 126 is mounted on outer ram connecting plate 360. Outer hydraulic cylinder 124, as used in the present embodiment, is manufactured by Aeroquip Corporation, Jackson, Mich. (Model No. TB-12) and is a hydraulic cylinder with a 1⅛" bore and 12" stroke.

Inner hydraulic cylinder 126 may be of a smaller capacity than outer hydraulic cylinder 124 since a smaller volume of ice cream is moved by inner ram 130. Inner hydraulic cylinder 126 may preferably be of the same type as outer hydraulic cylinder 124 but having a smaller capacity, for example, a ⅜" bore and a 4" stroke. While the specified hydraulic cylinders manufactured by Aeroquip Corporation are preferred, any hydraulic cylinder designed for use in food processing applications, and of sufficient capacity, may be used in the present embodiment.

Referring again to FIG. 4, fluid which exits either hydraulic cylinder 124 or 126 is returned to its respective hydraulic solenoid and valve manifold 264 or 266 and then to hydraulic fluid reservoir power pack 254 by way of return fluid line 260.

F. Operation of the Hydraulic System of the Preferred Embodiments

Figure 5:
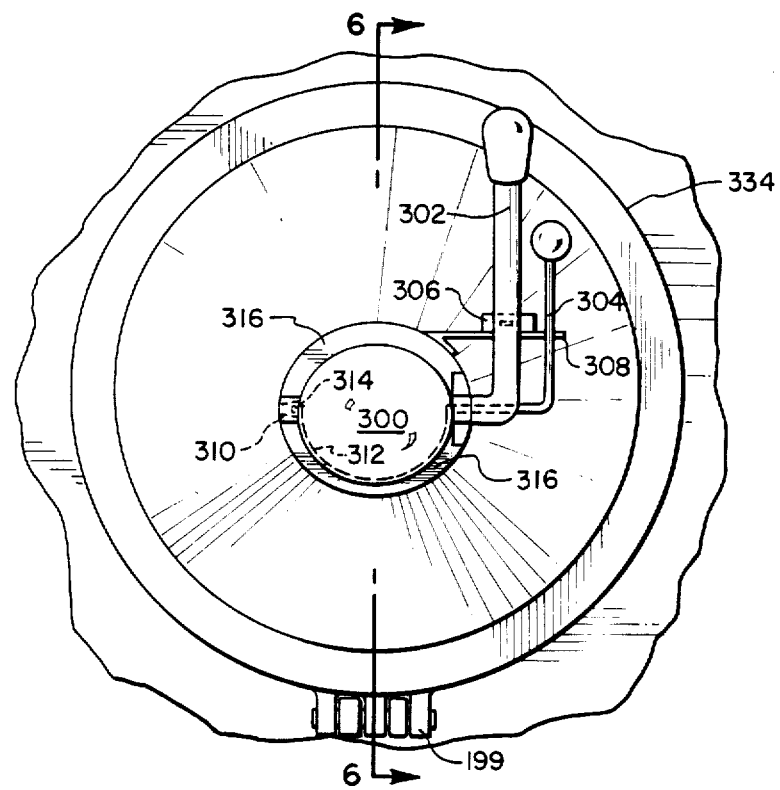
FIG. 5 is a front elevation view taken along line 5—5 of FIG. 2.

The movement of hydraulic cylinders 124 and 126 is controlled by a control mechanism generally comprising various components shown throughout the figures. As illustrated, the control mechanism consists of switch 306 (which is preferably a waterproof microswitch) as shown in FIGS. 5 and 6, timer 276 as shown in FIG. 4, and manual override switches 105A as shown in FIG. 1. Indicator lights 107A, shown in FIG. 1, convey operational information to the operator.

When a full container of ice cream has been inserted into retention chamber 132, manual override switches 105A are used to activate the cylinders, 124 and 126, so that rams 128 and 130 will move the ice cream out of retention chamber 132, and fill configuration chamber 136 and scoop 300. This operation is referred to as the initial filling mode. Cylinders 124 and 126 are allowed to operate as described earlier until configuration chamber 136 and scoop 300 are filled with ice cream, at which time the initial filling mode is discontinued, and the first portion of ice cream is ready to be served.

As shown best in FIGS. 5 and 6, the ice cream is held in configuration chamber 136 by scoop 300. Scoop 300 also partitions ice cream into individual servings as it is operated. Scoop 300 is preferably hemispherically shaped, as shown in FIG. 6, but due to the axial view of FIG. 5, and the orientation of configuration chamber 136, scoop 300 appears oval-shaped in FIG. 5.

Scoop 300 operates by first being filled with ice cream and then being pivoted about scoop pivot points 310, which are shown on scoop mounting ring 316, to the discharge position, shown by the dashed line marked 300A in FIG. 6. By pivoting scoop 300 as indicated, a spherical volume of ice cream is formed which then can be removed from scoop 300A by rotating scraper 312 to separate the ice cream from scoop 300A.

When scoop 300 is emptied and returned to the filling position scoop handle 302 actuates microswitch 306 which is connected to timer 276. Timer 276, which is connected to hydraulic solenoid and valve manifolds 264 and 266 by control line 278, as shown in FIG. 4, then operates the hydraulic cylinders 124 and 126, as explained above, for a predetermined length of time. The predetermined length of time has been set so as to allow pressure to be exerted upon the ice cream long enough so as to completely fill scoop 300 once again.

It will be appreciated that other control mechanisms could be used to control the operation of hydraulic cylinders 124 and 126. For example, it would be possible to incorporate into scoop 300 a pressure sensing element, not shown, which would be used to sense the pressure of the ice cream against the inner surface of scoop 300. When a pressure sensing element is used, the pressure against the inner surface of the scoop 300 would be sensed and when the pressure indicated that scoop 300 was completely filled, the control mechanism would stop the operation of hydraulic cylinders 124 and 126.

The use of hydraulic, rather than pneumatic, cylinders 124 and 126 allows the motion of rams 128 and 130 to be precisely started or stopped without rams 128 and 130 continuing to exert pressure on the ice cream after scoop 300 has been filled with a sufficient amount of ice cream. The maximum hydraulic pressures required to operate the illustrated embodiment are greatest during the initial filling mode and less during the serving mode. These pressures range from greater than 250 psi at each of hydraulic cylinders 124 and 126 during the initial filling mode which provides approximately 6 psi at the interface between the ice cream and each of rams 128 and 120, to less than 100 psi at cylinders 124 and 126 which provides approximately 2.4 psi at interface between the ice cream and rams 128 and 130. The advantage of using the illustrated double ram and cylinder arrangement can be appreciated by realizing that these pressures are about half the pressure required if a single ram and cylinder is used.

The above pressures are given only as examples of representative pressures since actual pressures may vary according to factors such as the amount and type of ice cream inserted into retention chamber 132. The rams 128 and 130 may be constructed of a material that is suitable for contact with foods and most preferably will be fabricated of stainless steel. It will be appreciated that a single ram structure, of a variety of shapes, could be readily incorporated in the present invention. Furthermore, a disposable ice cream container with an integral ram could be provided which would directly engage a single hydraulic cylinder. However, use of only one cylinder and ram is less desirable as the double cylinder and ram arrangement described above.

G. Frozen Food Directing Structures of the Preferred Embodiment

Retention chamber 132 is provided with an inner diameter of nine and three-quarter inches. This inner diameter allows a conventional ice cream container, partially shown in FIGS. 6 and 7 at 332, to be inserted within retention chamber 132 and also be in close proximity to retention chamber flooded evaporator inner wall 182. Once ice cream container 332 has been inserted into retention chamber 132, configuration chamber 136 is attached to retention chamber 132 so that configuration chamber 136 is positioned in line with the central axis of both retention chamber 132 and ice cream container 332, as shown in FIG. 6. Retention chamber central axis is represented by the line 133 shown in FIG. 6.

Figure 9:
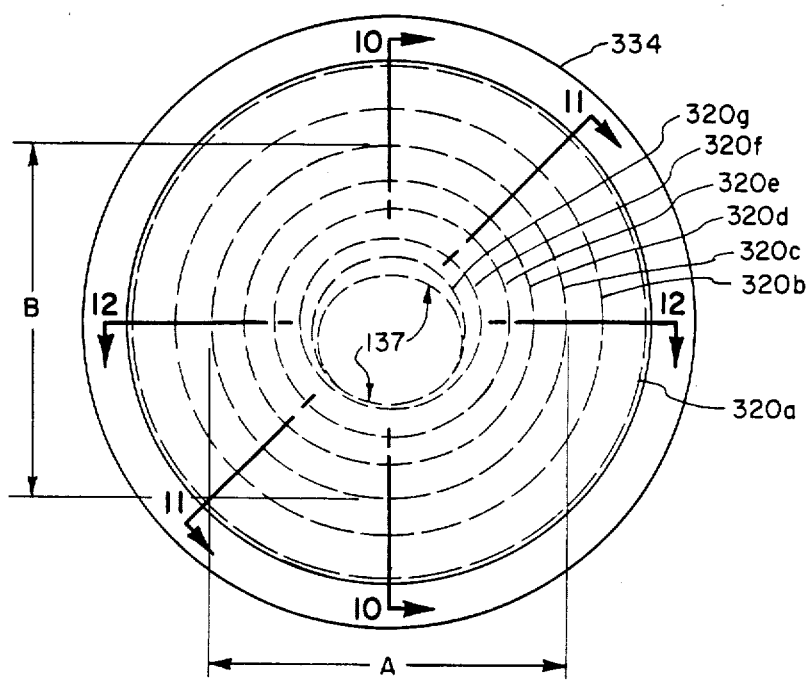
FIG. 9 is a diagram of the interior shape of the configuration chamber of the preferred embodiment.
Figure 12:
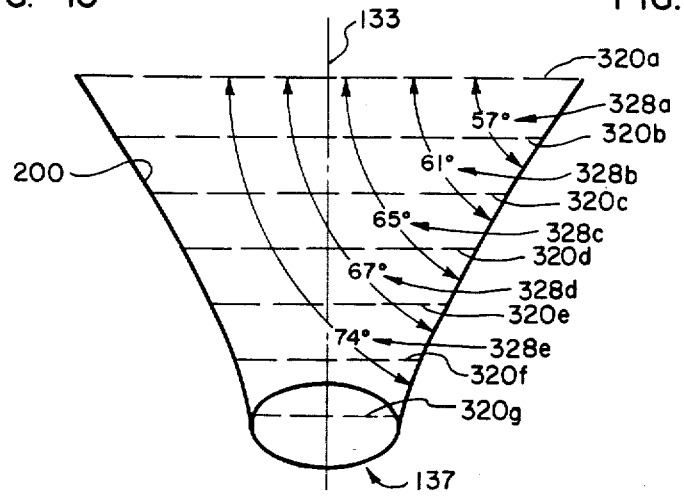
FIG. 12 is a cross-sectional view taken along line 12—12 of FIG. 9.

FIGS. 9 and 12 will now be referred to in order to describe in detail the interior shape of configuration chamber 136. In FIG. 9 the outer diameter of configuration chamber mounting rim 334, shown in cross section in FIG. 6, is indicated by the solid outermost circle marked 334. Configuration chamber opening is generally designated 137. The view shown in FIG. 9 is directly on-axis with retention chamber central axis 133 when configuration chamber 136 is attached to retention chamber 132. Because configuration chamber opening 137 is oriented at an angle, as will be explained later, opening 137 appears as an oval in FIG. 9, and also in FIG. 5, rather than as its actual circular shape.

Figure 10:
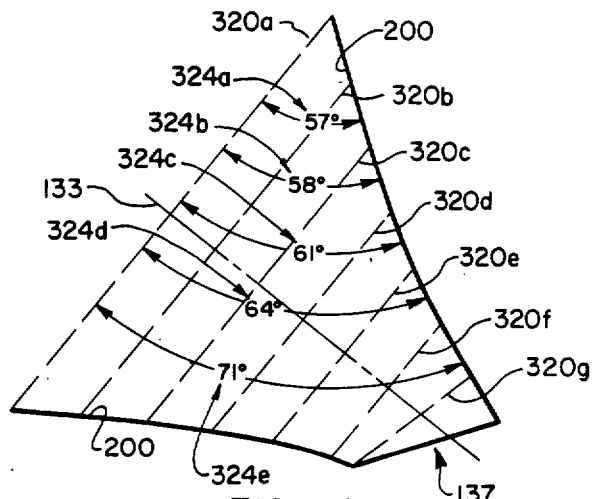
FIG. 10 is a cross-sectional view taken along line 10—10 of FIG. 9.
Figure 11:
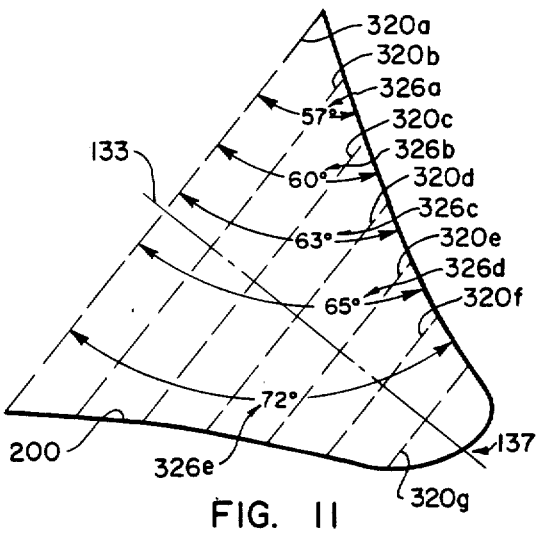
FIG. 11 is a cross-sectional view taken along line 11—11 of FIG. 9.

FIGS. 10, 11, and 12 are cross-sectional views taken along lines 10—10, 11—11, and 12—12, respectively, of FIG. 9. Contour lines 320a-320g in FIG. 9 have been placed around the interior perimeter of configuration chamber 136 and corresponding coutour lines 320a-320g have been placed on the views shown in FIGS. 10-12. In FIGS. 10-12 contour lines 320a-320g are oriented at right angles to retention chamber central axis 133 and are parallel to the diameter of retention chamber 132.

The interior shape of configuration chamber inner wall 200 is carefully chosen so as to first provide that the ice cream will be compressed to a lesser degree as it travels through configuration chamber 136. This is accomplished by orienting inner wall 200 at the angles shown in FIG. 10. FIG. 10 is a vertical cross section of configuration chamber 136. As can be seen in FIG. 10, inner wall 200 is formed so that the path encountered by the ice cream, as it flows through configuration chamber 136, is narrowed to a lesser extent as the ice cream moves toward configuration chamber opening 137. The changing angle at which inner wall 200 is oriented is indicated by angles 324a-324e in FIG. 10.

As is apparent from the angles shown in FIG. 10, inner wall 200 is first oriented at an angle of 57° 324a, and gradually changes to an angle of 71°, marked 324e, with reference to the diameter of retention chamber 132, as inner wall 200 approaches configuration chamber opening 137. As will be appreciated by examination of FIGS. 9 and 10, with inner wall 200 being oriented at the indicated angles, the pressure exerted upon the ice cream in configuration chamber 132 is increased more slowly as the ice cream travels toward configuration chamber opening 137. Configuration chamber 136 may be symmetrically constructed such that angles 324a-324e are the same anywhere along any of contour lines 320a-320g. However, the interior shape of configuration chamber 136 is preferably slightly oval.

Providing a configuration chamber 136 with a slightly oval shape, when viewed axially, allows for better control of the ice cream as it flows through configuration chamber 136. The configuration chamber interior shape is circular at the end attached to mounting rim 334 and at the opening 137. The oval shape is incorporated by altering the angle of orientation of inner wall 200 between mounting rim 334 and opening 137.

In FIG. 9, the preferred oval shape is not readily apparent, but is evidenced by the difference between the dimension marked A, taken along contour line 320c, which is longer than the dimension marked B, also taken along contour line 320c. The preferred oval shape is implemented in addition to reducing the angle at which configuration chamber inner wall 200 narrows, as explained above in connection with FIG. 10.

In order to show some representative angles at which inner wall 200 may be oriented when using the preferred oval-shaped configuration chamber 136, FIGS. 11 and 12 are provided. FIG. 11 is a cross section view taken along line 11—11 of FIG. 10 (i.e., rotated 45° from the vertical view of FIG. 10). As can be seen in FIG. 11, angle 326a is equal to angle 324a (57°) but angles 326b through 326e are greater than their respective angles, 324b through 324e, shown in FIG. 10.

FIG. 12 is a cross section taken along line 12—12 of FIG. 10 (i.e., rotated 90° from the vertical view of FIG. 10). As can be seen in FIG. 12, angle 328a is equal to angle 326a and 324a (57°). However, angles 328b through 328e are greater than their respective angles, 326b through 326e shown in FIG. 11, and 324b through 324e shown in FIG. 10. The angles shown in FIGS. 10, 11, and 12 are substantially symmetrical about retention chamber central axis 133 so the angles not shown in FIGS. 10, 11, and 12 may be easily ascertained by using the angles shown in FIGS. 10, 11, and 12 for sections taken on the vertical, diagonal and horizontal planes, respectively.

Furthermore, inner wall 200 is smooth and gradually changes angles from one value to the next, rather than making abrupt transitions. Thus, the interior shape of configuration chamber 136 is slightly oval as explained above in connection with dimensions A and B as shown in FIG. 9 and the angles shown in FIGS. 10, 11, and 12. It should be appreciated that the angles shown in FIGS. 10, 11, and 12 are merely representative of the presently preferred structure for configuration chamber 136 and other angles, for example in the range of plus or minus 100 from those shown in FIGS. 10-12, could be incorporated according to the present invention.

Scoop 300, as shown in FIGS. 5 and 6, is generally hemispherically shaped and hinged about scoop pivot points 310 as shown in FIG. 5. Scoop 300 is shown in the fill position in both FIGS. 5 and 6. After scoop 300 has been filled with ice cream it is rotated to the discharge position by moving handle 302, as shown by the dashed lines marked 300A and 302A in FIG. 6. Scraper blade 312 is rotated about scraper pivot points 314, shown in FIG. 5, to separate the now spherically shaped volume of ice cream from scoop 300. Scoop 300 is then returned to the filling position to begin another serving cycle.

Configuration chamber opening, generally designated 137 in FIG. 6, is structured such that, when scoop 300 is in the discharge position, the spherical volume of ice cream is able to drop nearly directly downward from the scoop 300. Configuration chamber opening 137 is placed at an angle by providing that a first side, generally designated 201 in FIG. 6, of configuration chamber 136 is longer than the side directly opposite, generally designated 203.

In order to facilitate providing the desired angle at which configuration chamber opening should be oriented, which may be in the range of about 0° to about 45° and in the illustrated embodiment 30° from the horizontal, is marked as angle C in FIG. 6, retention chamber 132 is oriented at an angle in the range between about 15° to about 45° and preferably is 30° from the horizontal, as shown at angle D in FIG. 6. Orienting retention chamber 132 at about 30° allows the angle at which configuration chamber opening must be oriented (angle C) to be less in order to provide a nearly direct downward drop of the spherical volume of ice cream.

As can be seen in FIG. 5, scoop 300, handle 302, handle 304, and pivot points 310 and 314 are attached to scoop mounting ring 316. Scoop mounting ring 316 is engaged within configuration chamber opening 137 by threads 328. This allows scoops of various sizes to be easily interchanged. For example, scoops ranging in size from two and three-quarters inches in diameter to two inches in diameter are readily accommodated in the illustrated embodiment.

H. Summary

By the use of the embodiment described herein, a practical and efficient frozen food dispensing system is provided. Using separate refrigeration circuits to maintain frozen foods at an appropriate tempering temperature, holding temperature, or serving temperature allows frozen foods, particularly ice cream, to be dispensed in an extruded form without degradation in quality. In fact, providing a system for the mechanized dispensing of ice cream allows commercial ice cream serving establishments to overcome many of the problems inherent in manual methods of serving ice cream.

As will be appreciated by an understanding of the foregoing description, the present invention solves many of the problems experienced in the prior art. First, the present invention provides a mechanized frozen food dispensing system wherein the quality of the ice cream is consistently maintained from storage to serving of the ice cream. Second, the present invention allows ice cream to be dispensed with a minimum of manual effort. Third, the present invention provides a mechanized ice cream dispenser which isolates the ice cream from unsanitary conditions.

Fourth, the present invention inhibits the growth of harmful organisms in the ice cream. Fifth, the present invention allows the size of individual portions of ice cream to be consistently maintained from serving to serving.

It will be appreciated that the apparatus and method of the present invention are capable of being incorporated in the form of a variety of embodiments, only one of which has been illustrated and described above. The invention may be embodied in other specific forms without departing from its spirit or essential characteristics. The described embodiment is to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for dispensing frozen or refrigerated food comprising:
   means for retaining a volume of food, said means having a first and a second end;
   first temperature control means for maintaining the volume of food within the retaining means at a predetermined holding temperature;
   means for moving the food through the first end of the retaining means;
   means for configuring the food as the food is moved out of the first end of the retaining means, the configuring means allowing for passage of the food there through to an outlet of the configuring means;

second temperature control means for maintaining the food in the configuring means at a predetermined serving temperature, the serving temperature being higher than the holding temperature; and means for controlling the passage of the food through the outlet of the configuring means.

2. A system as defined in claim 1 further comprising means for maintaining the volume of frozen food at a predetermined tempering temperature before the frozen food is retained in the retaining means.

3. A system as defined in claim 1 wherein the moving means comprises two hydraulic cylinders and two rams, each cylinder and ram being individually controllable so as to move the frozen food out of the retaining means and through the configuring means.

4. A system as defined in claim 1 wherein the configuring means is of approximately conical shape.

5. A system as defined in claim 1 wherein the configuring means comprises a member presenting a narrowing path to the frozen food as it is moved into the configuring means, the member being oriented so that the path continues to narrow at a gradually decreasing rate until the frozen food enters the means for controlling the passage of the food.

6. A system as defined in claim 1 wherein the configuring means is ovally-shaped along at least a portion of its interior circumference.

7. A system as defined in claim 1 wherein the configuring means comprises a flooded evaporator.

8. A system as defined in claim 1 wherein the configuration means comprises both an interior and an exterior wall, and wherein the interior wall defines a narrowing path, the narrowing path narrowing most rapidly at the end of the configuration chamber attached to the retention chamber and narrowing least rapidly at the end of configuration chamber nearest the configuration chamber opening.

9. A system as defined in claim 8 wherein the configuration means inner wall is oriented at an angle relative to the retention chamber central axis, the angle gradually varying from:

at a vertical plane through the configuration chamber, from about 57° to about 71°;

at a plane through the configuration chamber perimetrically rotated 45° from the vertical plane, from about 57° to about 72°;

at a plane through the configuration chamber perimetrically rotated 90° from the vertical plane, from about 57° to 74°;

such that the configuration chamber interior shape is generally oval-shaped.

10. A system for dispensing frozen foods comprising:

a retention chamber for retaining a volume of frozen food, the retention chamber having a first end and a second end;

a first chamber temperature control means for adjusting and maintaining the temperature of the volume of frozen food retained in the retention chamber at a predetermined holding temperature;

means for forcing the frozen food out of the first end of the retention chamber;

a configuration chamber attached to the first end of the retention chamber, the configuration chamber being capable of receiving the frozen food as it is forced out of the retention chamber and being capable of allowing passage of the frozen food there through to an opening provided in the configuration chamber;

a second chamber temperature control means for adjusting and maintaining the temperature of the frozen food in the configuration chamber at a predetermined serving temperature, the serving temperature being higher than the holding temperature; and valve means for controlling the flow of the frozen food through the opening in the configuration chamber.

11. A system as defined in claim 10 further comprising a tempering chamber for maintaining the volume of frozen food at a tempering termperature before the frozen food is placed in the retention chamber.

12. A system as defined in claim 10 wherein the retention chamber is oriented at an angle between 15° and 45° from horizontal.

13. A system as defined in claim 10 wherein the first chamber temperature control means further comprises a flooded evaporator placed around the volume of frozen food.

14. A system as defined in claim 13 wherein the retention chamber comprises a metallic jacket for retaining the volume of frozen food, the jacket being substantially encompassed about its circumference by the flooded evaporator.

15. A system as defined in claim 10 further comprising an outer hydraulic cylinder connected to an outer ram and an inner hydraulic cylinder connected to an inner ram, each cylinder and ram being individually controllable so as to allow the frozen food to be moved out of the retention chamber and through the configuration chamber.

16. A system a defined in claim 10 wherein the means for forcing the frozen food moves the frozen food in response to a signal from a control means, the control means sensing the position of the valve means.

17. A system as defined in claim 10 wherein the means for forcing the frozen food moves the frozen food in response to a sensing means, the sensing means sensing the presence of said frozen food at the valve means.

18. A system as defined in claim 10 wherein the configuration chamber comprises both an interior and an exterior wall, and wherein the interior wall defines a narrowing path, the narrowing path narrowing most rapidly at the end of the configuration chamber attached to the retention chamber and narrowing least rapidly at the end of configuration chamber nearest the configuration chamber opening.

19. A system as defined in claim 18 wherein the portion of the configuration chamber interior wall nearest the retention chamber is oriented at an angle of about 57° in relation to the diameter of the retention chamber.

20. A system as defined in claim 18 wherein the portion of the configuration chamber interior wall nearest the configuration chamber opening is oriented at an angle in the range of about 71° to about 74° in relation to the diameter of the retention chamber.

21. A system as defined in claim 10 wherein the configuration chamber is ovally-shaped along at least a portion of its interior circumference.

22. A system as defined in claim 10 wherein the configuration chamber is ovally-shaped along at least a portion of its interior, the interior being defined by an inner wall, the inner wall being oriented at an angle relative to the retention chamber central axis, the angle gradually varying from:
- at a vertical plane through the configuration chamber, from about 57° to about 71.°.
- at a plane through the configuration chamber perimetrically rotated 45° from the vertical plane, from about 57° to about 72°;
- at a plane through the configuration chamber perimetrically rotated 90° from the vertical plane, from about 57° to 74°;
- such that the configuration chamber interior shape is generally oval-shaped.

23. A system as defined in claim 10 wherein the valve means comprises a scoop-shaped valve.

24. A system as defined in claim 23 wherein the scoop-shaped valve comprises a generally hemispherical scoop.

25. A system as defined in claim 23 wherein the scoop may be removed and interchanged with other scoops so as to provide for the partitioning of the frozen food into various-sized servings.

26. A system as defined in claim 10 wherein the plane defined by the opening diameter of the configuration chamber opening is oriented at an angle of between 0° and 40° from the horizontal so as to facilitate the efficient removal of the frozen food from the valve means.

27. A system as defined in claim 1 wherein the configuration chamber comprises a flooded evaporator.

28. A system as defined in claim 27 wherein the configuration chamber comprises both an interior wall and an exterior wall which define a cavity and wherein the flooded evaporator is disposed in the cavity.

29. A system for dispensing frozen foods comprising:
- a tempering chamber for tempering a volume of frozen food;
- a tempering chamber evaporator for adjusting and maintaining the frozen food in the tempering chamber at a predetermined tempering temperature;
- a retention chamber for retaining a volume of frozen food;
- a retention chamber flooded evaporator for adjusting and maintaining the frozen food retained in the retention chamber at a predetermined holding temperature;
- at least one ram extendable into the retention chamber, each ram applying on demand intermittent pressure on the frozen food so as to be capable of incrementally moving the frozen food out of the retention chamber;
- a configuration chamber for receiving the frozen food as the frozen food is moved out of the retention chamber, the configuration chamber having an approximately conical inner shape and an outlet near its apex, the configuration chamber inlcuding an inner wall defining a narrowing path to the frozen food as the frozen food is moved into the configuration chamber, the inner wall being oriented at a varying angle such that the path encountered by the frozen food is narrowed to a lesser extent as the inner wall approaches the outlet;
- a configuration chamber flooded evaporator for adjusting and maintaining the frozen food in the configuration chamber at a predetermined serving temperature, the serving temperature being higher than the holding temperature;
- a valve positioned at the outlet of the configuration chamber, the valve comprising:
  - a member formed in a scoop-like shape; and
  - pivoting means for allowing the scoop-like member to pivot from a filling position for receiving the frozen food to a discharge position, the scoop-like member partitioning the frozen food as the scoop-like member pivots to the discharge position and the frozen food is made available for serving when the scoop-like member reaches the discharge position.

30. A system for dispensing ice cream comprising:
- means for retaining a volume of ice cream, said means having a first and a second end;
- first temperature control means for maintaining the volume of ice cream within the retaining means at a predetermined holding temperature;
- means, located at the second end of the retaining means, for moving the food through the first end of the retaining means;
- means for configuring the ice cream as the ice cream is moved out of the first end of the retaining means, the configuring means allowing for passage of the ice cream there through to an outlet of the configuring means;
- second temperature control means for maintaining the ice cream in the configuring means at a predetermined serving temperature, the serving temperature being higher than the holding temperature; and
- means for controlling the passage of the ice cream as it passes through the outlet of the configuring means.

31. A system as defined in claim 30 further comprising means for maintaining the volume of ice cream at a predetermined tempering temperature before the ice cream is retained in the retaining means.

32. A system as defined in claim 30 wherein the moving means comprises two hydraulic cylinders and two rams, each cylinder and ram being individually controllable so as to move the ice cream out of the retaining means and through the configuring means.

33. A system as defined in claim 30 wherein the configuring means is of approximately conical shape.

34. A system as defined in claim 30 wherein the configuring means comprises a member presenting a narrowing path to the ice cream as it is moved into the configuring means, the member being oriented so that the path continues to narrow at a gradually decreasing rate until the ice cream enters the means for controlling the passage of the ice cream.

35. A system as defined in claim 30 wherein the configuring means is ovally-shaped along at least a portion of its interior circumference.

36. A system as defined in claim 30 wherein the configuring means comprises a flooded evaporator.

37. A system as defined in claim 30 wherein the retention means comprises a metallic jacket for retaining the volume of ice cream, the jacket being substantially encompassed about its circumference by the flooded evaporator.

38. A system as defined in claim 30 wherein the means for controlling passage of the ice cream comprises a scoop-shaped valve.

* * * * *

UNITED STATES PATENT AND TRADEMARK OFFICE
CERTIFICATE OF CORRECTION

PATENT NO. : 4,707,997

DATED : November 24, 1987

INVENTOR(S) : Mont D. Bigler et al.

It is certified that error appears in the above-identified patent and that said Letters Patent are hereby corrected as shown below:

Column 9, line 50, "an fan 167" should be --a fan 167--
Column 9, line 61, "of sensing bulb" should be --of the sensing bulb--
Column 10, line 25, "respect" should be --respective--
Column 12, line 21, "3 Also," should be --3. Also,--
Column 21, line 1, "there through" should be --therethrough--
Column 21, lines 38-39 "at the end of configuration chamber" should be --at the end of the configuration chamber--
Column 22, line 50, "at the end of configuration chamber" should be --at the end of the configuration chamber--
Column 23, line 4, "71.°." should be --71°,--
Column 23, line 54, "inlcuding" should be --including--
Column 24, line 23, "there through" should be --therethrough--
Abstract, line 2, "tampering chamber" should be --tempering chamber--

Signed and Sealed this

Twenty-eighth Day of June, 1988

Attest:

DONALD J. QUIGG

Attesting Officer

Commissioner of Patents and Trademarks